United States Patent
Ikeda

(10) Patent No.: US 12,430,748 B2
(45) Date of Patent: Sep. 30, 2025

(54) IMAGE INSPECTION DEVICE, IMAGE INSPECTION METHOD, AND PRELEARNED MODEL GENERATION DEVICE

(71) Applicant: OMRON Corporation, Kyoto (JP)

(72) Inventor: Yasuyuki Ikeda, Kyoto (JP)

(73) Assignee: OMRON Corporation, Kyoto (JP)

( * ) Notice: Subject to any disclaimer, the term of this patent is extended or adjusted under 35 U.S.C. 154(b) by 575 days.

(21) Appl. No.: 17/917,237

(22) PCT Filed: Mar. 10, 2021

(86) PCT No.: PCT/JP2021/009503
§ 371 (c)(1),
(2) Date: Oct. 5, 2022

(87) PCT Pub. No.: WO2021/229905
PCT Pub. Date: Nov. 18, 2021

(65) Prior Publication Data
US 2023/0162343 A1    May 25, 2023

(30) Foreign Application Priority Data
May 15, 2020 (JP) .................................. 2020-085965

(51) Int. Cl.
*G06T 7/00*    (2017.01)
*G06T 7/11*    (2017.01)
*G06V 10/74*   (2022.01)

(52) U.S. Cl.
CPC .............. *G06T 7/0008* (2013.01); *G06T 7/11* (2017.01); *G06V 10/761* (2022.01)

(58) Field of Classification Search
CPC ......... G06T 2207/20084; G06T 7/0004; G06T 7/0008; G06T 7/11; G06T 2207/20021;
(Continued)

(56) References Cited

U.S. PATENT DOCUMENTS

| | | | |
|---|---|---|---|
| 2019/0139213 A1* | 5/2019 | Kurita | G06F 18/214 |
| 2020/0111217 A1* | 4/2020 | Yokoyama | G06N 3/047 |
| 2020/0160083 A1* | 5/2020 | Zhu | G06N 3/08 |

FOREIGN PATENT DOCUMENTS

| | | |
|---|---|---|
| JP | 2017211259 | 11/2017 |
| JP | 2018005773 | 1/2018 |

(Continued)

OTHER PUBLICATIONS

"International Search Report (Form PCT/ISA/210) of PCT/JP2021/009503", mailed on May 25, 2021, with English translation thereof, pp. 1-4.

(Continued)

*Primary Examiner* — Li Liu
(74) *Attorney, Agent, or Firm* — JCIPRNET

(57) ABSTRACT

An image inspection device includes: a divided image generation part for inputting a divided inspection image obtained by dividing an image of an inspection object and a surrounding-containing image that includes an image based on at least some of the surrounding images of the divided inspection image to a prelearned model having been trained so as to accept as inputs a divided good-article image obtained by dividing an image of a good-article inspection object and an image including an image based on at least some of the surrounding images of the divided good-article image and output a restored divided image; and an inspection part for performing inspection of the inspection object on the basis of the restored divided image generated by the divided image generation part.

20 Claims, 15 Drawing Sheets

(58) Field of Classification Search
CPC . G06T 2207/20081; G06T 2207/30108; G06T 7/00; G06T 7/0002; G06V 10/761; G06V 10/82; G06V 10/774; G06V 30/19147; G06N 20/00; G06N 3/04; G06N 3/08
See application file for complete search history.

(56) References Cited

FOREIGN PATENT DOCUMENTS

| | | |
|---|---|---|
| JP | 2018205163 | 12/2018 |
| JP | 2019087078 | 6/2019 |
| JP | 2020003837 | 1/2020 |
| JP | 2021174417 A | * 11/2021 |

OTHER PUBLICATIONS

"Written Opinion of the International Searching Authority (Form PCT/ISA/237) of PCT/ JP2021/009503", mailed on May 25, 2021, with English translation thereof, pp. 1-7.

* cited by examiner

IMAGE INSPECTION DEVICE, IMAGE INSPECTION METHOD, AND PRELEARNED MODEL GENERATION DEVICE

CROSS-REFERENCE TO RELATED APPLICATION

This application is a 371 application of the International PCT application serial no. PCT/JP2021/009503, filed on Mar. 10, 2021, which claims the priority benefits of Japan Patent Application No. 2020-085965, filed on May 15, 2020. The entirety of each of the above-mentioned patent applications is hereby incorporated by reference herein and made a part of this specification.

TECHNICAL FIELD

The disclosure relates to an image inspection device, an image inspection method, and a prelearned model generation device.

RELATED ART

Conventionally, there has been known an image inspection device that inspects an object based on a captured image of the object.

For example, Patent Literature 1 discloses an abnormality determination device that performs an abnormality determination based on determination target image data that is input to determine an abnormality. The abnormality determination device has a processing performing part for performing abnormality determination processing that uses reconstruction parameters for reconstructing normal image data from feature amounts extracted from the normal image data group, generates reconstructed image data from the feature amounts of the determination target image data, and performs abnormality determination based on difference information between the generated reconstructed image data and the determination target image data.

When determination target image data includes image data of multiple channels, the abnormality determination device of Patent Literature 1 generates reconstructed image data for each channel from the feature amounts of the image data of each channel using reconstruction parameters, and performs the abnormality determination based on difference information between each generated reconstructed image data and image data of each channel of the determination target image data.

CITATION LIST

Patent Literature

[Patent Literature 1] Japanese Patent Application Laid-Open No. 2018-5773

SUMMARY

Technical Problem

In Patent Literature 1, a trained autoencoder, which is a prelearned model, is used to generate a reconstructed image from a determination target image. Here, for example, when there is a local special pattern in the image of a good-article inspection target, if the prelearned model has low expressive ability, it may not be possible to restore the special pattern in the image generated by the prelearned model. In this case, there is a risk that the image of the inspection target, which is a good-article product, may be erroneously determined to be defective.

In addition, in an image of a good-article inspection target, if a pattern at one position or part that is good is a defect at another position or part, a defective-article pattern may be generated in the images generated by the prelearned model, and defective-article inspection targets may be overlooked.

Therefore, the disclosure provides an image inspection device, an image inspection method and a prelearned model generation device, with which it is possible to restore a special pattern and suppress the generation of a defective-article pattern.

Solution to Problem

An image inspection device according to an embodiment of the disclosure includes: a divided image generation part that inputs a divided inspection image, which is an image obtained by dividing an image of an inspection target, and a surrounding-containing image, which includes an image based on at least a part of a surrounding image of the divided inspection image, to a prelearned model, which has been trained to receive a divided good-article image, which is an image obtained by dividing an image of a good-article inspection target, and an image which includes an image based on at least a part of a surrounding image of the divided good-article image as an input to output a restored divided image, to generate the restored divided image; and an inspection part that inspects the inspection target based on the restored divided image generated by the divided image generation part.

According to this embodiment, it is possible to generate the restored divided image based on the divided inspection image and the image including its surrounding image. Therefore, it is possible to generate a more appropriate restored divided image than when only the divided inspection image is used. As a result, even if the divided inspection image includes a special pattern at a specific position, the special pattern may be restored. Furthermore, even if the divided inspection image partially includes a defective-article pattern, a restored divided image including a good-article pattern may be generated, thereby suppressing generation of a defective-article pattern.

In the above embodiment, the divided image generation part may input each of multiple input data sets each configured by the divided inspection image and the surrounding-containing image to the prelearned model, and generate multiple restored divided images, and the inspection part may inspect the inspection target based on the multiple restored divided images.

According to this embodiment, the inspection may be performed based on the multiple restored divided images, so that the inspection target may be inspected more accurately.

In the above embodiment, the image inspection device may further include a restored image generation part that generates a restored image by synthesizing the multiple restored divided images, and the inspection part may inspect the inspection target based on a difference between the image of the inspection target and the restored image.

According to this embodiment, the difference between the image of the inspection target and the restored image becomes clear, and it becomes possible to inspect the inspection target with higher accuracy.

In the above embodiment, the surrounding-containing image may include an image obtained by reducing at least a part of the surrounding image of the divided inspection image.

In this way, it is possible to generate the restored divided image with higher accuracy, so that the inspection target may be inspected with higher accuracy.

In the above embodiment, the inspection part may determine whether the inspection target is good or defective.

According to this embodiment, the inspection target may be inspected in more detail.

In the above embodiment, the inspection part may detect defects in the inspection target.

According to this embodiment, the inspection target may be inspected in more detail.

In the above embodiment, the image inspection device may further include an imaging part that captures the image of the inspection target.

According to this embodiment, the image of the inspection target may be easily acquired.

In the above embodiment, the image inspection device may further include a dividing part that divides the image of the inspection target into multiple divided inspection images.

According to this embodiment, it is possible to inspect the inspection target even if the image of the inspection target is not divided in advance.

An image inspection method according to another embodiment of the disclosure is performed by a computer including a processor, and the processor performs: inputting a divided inspection image, which is an image obtained by dividing an image of an inspection target, and a surrounding-containing image, which includes an image based on at least a part of a surrounding image of the divided inspection image, to a prelearned model, which has been trained to receive a divided good-article image, which is an image obtained by dividing an image of a good-article inspection target, and an image which includes an image based on at least a part of a surrounding image of the divided good-article image as an input to output a restored divided image, to generate the restored divided image; and inspecting the inspection target based on the generated restored divided image.

According to this embodiment, it is possible to generate the restored divided image based on the divided inspection image and the image including its surrounding image. Therefore, it is possible to generate a more appropriate restored divided image than when only the divided inspection image is used. As a result, even if the divided inspection image includes a special pattern at a specific position, the special pattern may be restored. Furthermore, even if the divided inspection image partially includes a defective-article pattern, a restored divided image including a good-article pattern may be generated, thereby suppressing generation of a defective-article pattern.

A prelearned model generation device according to another embodiment of the disclosure includes: a model generation part that performs learning processing using multiple data sets each configured by a divided good-article image, which is an image obtained by dividing an image of a good-article inspection target, and a surrounding-containing image, which includes the divided good-article image and at least a part of a surrounding image of the divided good-article image, and generates a prelearned model which receives the divided good-article image and the surrounding-containing image as an input to output a restored divided image.

According to this embodiment, it is possible to generate the restored divided image based on the divided inspection image and the image including its surrounding image. Therefore, it is possible to generate a more appropriate restored divided image than when only the divided inspection image is used. As a result, even if the divided inspection image includes a special pattern at a specific position, the special pattern may be restored. Furthermore, even if the divided inspection image partially includes a defective-article pattern, a restored divided image including a good-article pattern may be generated, thereby suppressing generation of a defective-article pattern.

Effects of Invention

According to the disclosure an image inspection device, an image inspection method and a prelearned model generation device, with which it is possible to restore a special pattern and suppress the generation of a defective-article pattern, may be provided.

DESCRIPTION OF THE EMBODIMENTS

Exemplary embodiments of the disclosure will be described with reference to the accompanying drawings.

Figure 1:
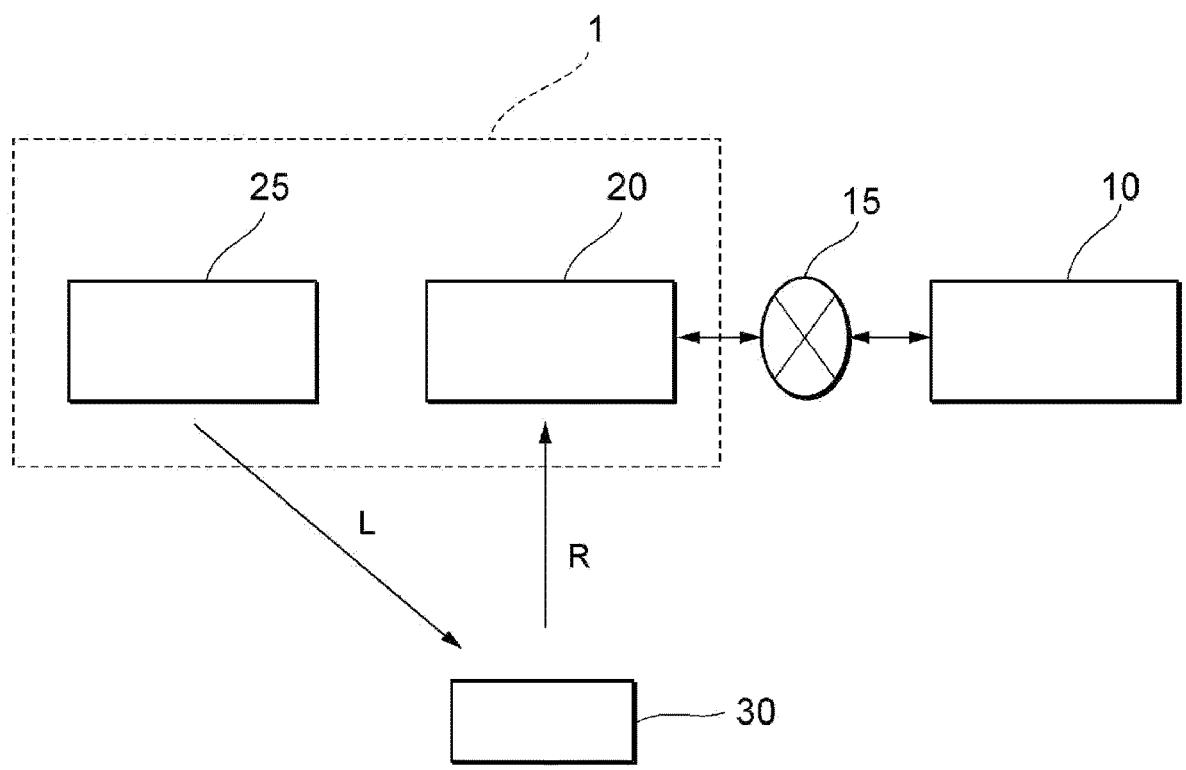
FIG. 1 is a schematic configuration diagram of an image inspection system according to an embodiment of the disclosure.

FIG. 1 is a schematic configuration diagram of an image inspection system 1 according to an embodiment of the disclosure. The image inspection system 1 includes an image inspection device 20 and lighting 25. The lighting 25 irradiates an inspection target 30 with light L. The image inspection device 20 captures an image of reflected light R and inspects the inspection target 30 based on the image (hereinafter also referred to as an "inspection image") of the inspection target 30. The image inspection device 20 is connected to a prelearned model generation device 10 via a communication network 15. The prelearned model generation device 10 generates a prelearned model used by the image inspection device 20 to inspect the inspection target 30.

Figure 2:
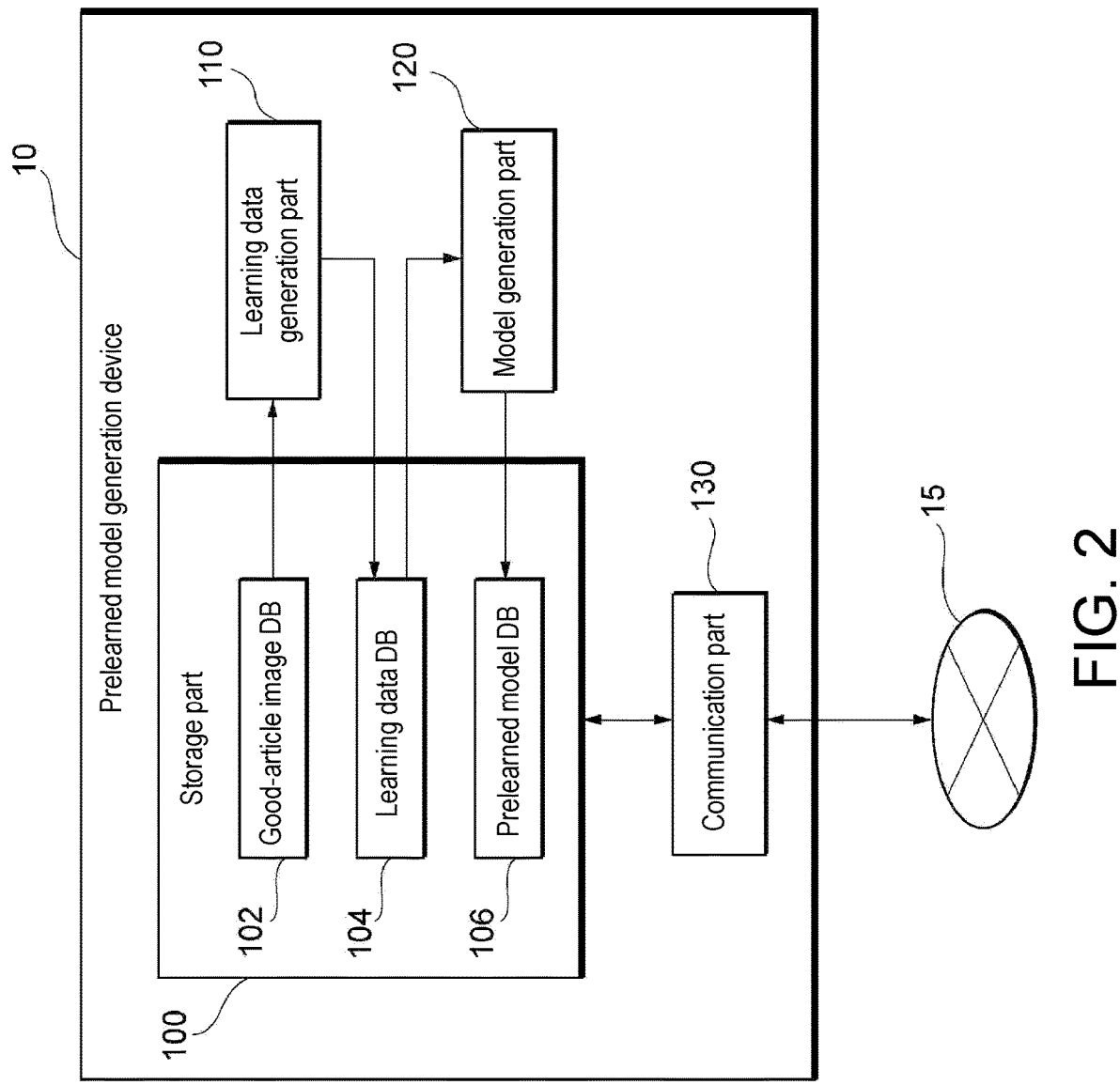
FIG. 2 is a functional block diagram showing the configuration of the prelearned model generation device according to the same embodiment.

FIG. 2 is a functional block diagram showing the configuration of the prelearned model generation device 10 according to this embodiment. The prelearned model generation device 10 includes a storage part 100, a learning data generation part 110, a model generation part 120 and a communication part 130.

The storage part 100 stores various information. In this embodiment, the storage part 100 includes a good-article image DB 102, a learning data DB 104, and a prelearned model DB 106. Multiple good-article images are stored in the good-article image DB 102. A good-article image is an image of a good-article inspection target. Further, the learning data DB 104 stores multiple learning data sets, each of which is configured by a set of divided good-article images obtained by dividing a good-article image and good-article surrounding-containing images. The good-article surrounding-containing image is an image including an image based on a good-article surrounding image. In this embodiment, the good-article surrounding-containing image is an image including a good-article surrounding image and a divided good-article image. Here, the good-article surrounding image is at least a part of the image of the surrounding of the divided good-article image. Further, the prelearned model DB 106 stores prelearned models generated by the prelearned model generation device 10, which will be described later.

Figure 3:
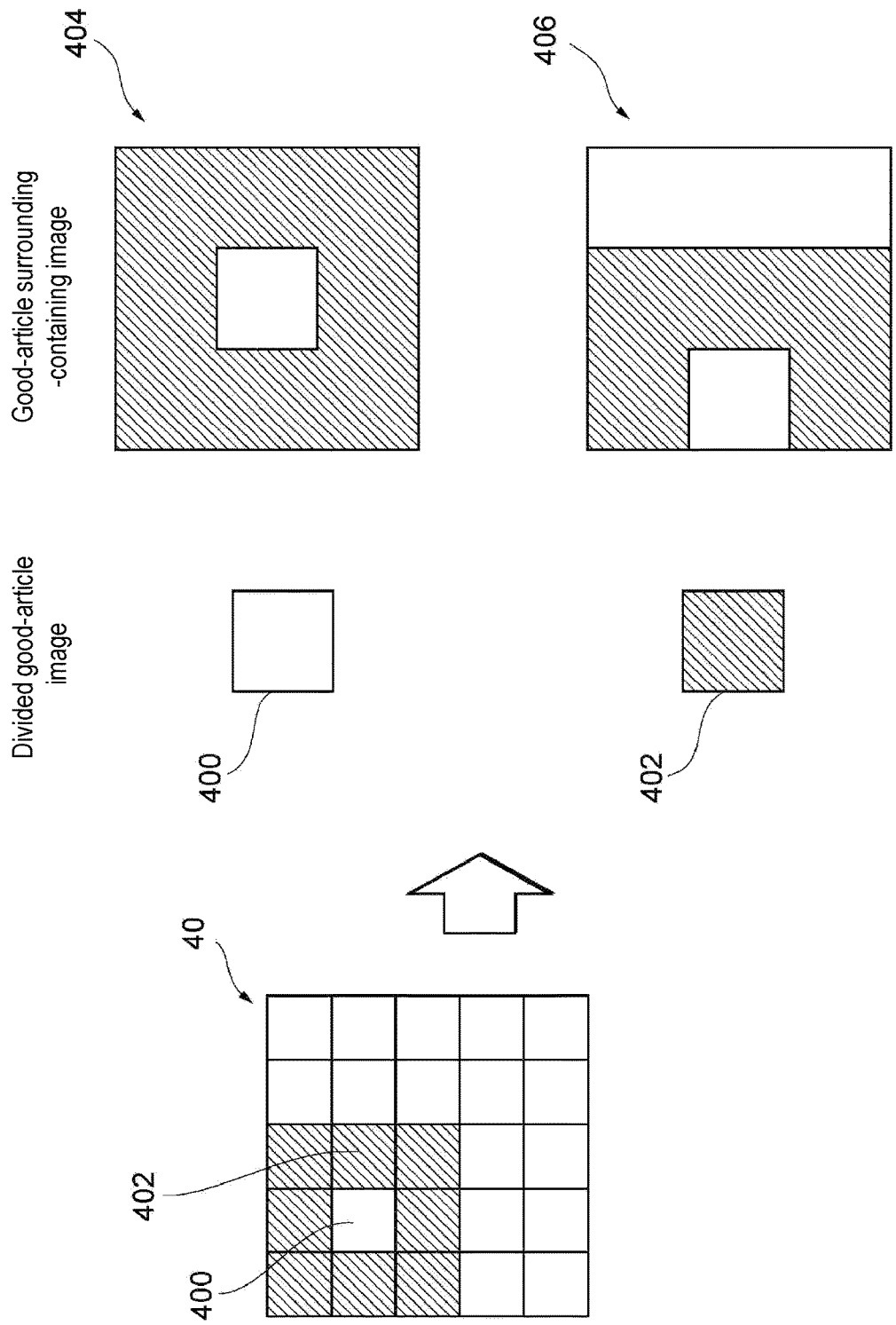
FIG. 3 is a diagram illustrating a learning data set generated by a learning data generation part.

The learning data generation part 110 may generate a learning data set used for the model generation part 120 to perform learning processing. A learning data set generated by the learning data generation part 110 will be described with reference to FIG. 3.

The learning data generation part 110 acquires a good-article image from the good-article image DB 102 and divides the good-article image 40 to generate multiple divided good-article images. In this embodiment, the learning data generation part 110 generates a total of 25 divided good-article images by dividing the good-article image 40 into five parts both vertically and horizontally. The good-article image 40 may be divided into 2 to 24 divided good-article images, or may be divided into 26 or more divided good-article images. Further, the shape of the divided good-article image is not limited to a rectangle, and may be any shape.

In addition, the learning data generation part 110 generates good-article surrounding-containing images for each of the multiple divided good-article images to generate multiple learning data sets respectively configured by the divided good-article image and the divided good-article surrounding images. In this embodiment, the learning data generation part 110 generates a divided good-article images a learning data set for each of the nine divided good-article images of the twenty-five divided good-article images included in the good-article image 40, excluding the sixteen divided good-article images arranged at the edges.

For example, the learning data generation part 110 generates a first good-article surrounding-containing image 404 including divided good-article images surrounding a first divided good-article image 400 positioned second from the left and second from the top. The first divided good-article image 400 and the first good-article surrounding-containing image 404 configure one learning data set. Similarly, the learning data generation part 110 generates a learning data set based on each of the nine divided good-article images, such as a learning data set of a second divided good-article image 402 and a second good-article surrounding-containing image 406.

Here, the first good-article surrounding-containing image 404 includes eight divided good-article images positioned around the first divided good-article image 400 as good-article surrounding images, but the good-article surrounding images do not have to include all the eight divided good-article images. In addition, in this embodiment, the good-article surrounding image may not be configured in units of divided good-article images, and may be configured in any unit. That is, the good-article surrounding image may be configured in units smaller than the divided good-article image, or may be configured in units larger than the divided good-article image.

In this embodiment, the good-article surrounding image is not directly used for inspection of the inspection target. In addition, when the resolution of the divided good-article image and the resolution of the good-article surrounding image are the same, if the number of pixels of the good-article surrounding image is larger than the number of pixels of the divided good-article image, the good-article surrounding image contributes more to the learning processing than the divided good-article image. Therefore, when the expressive ability of the model is low, it becomes impossible to obtain sufficient restoration accuracy for the divided good-article image.

Therefore, it is preferable that the contribution of the good-article surrounding image to the learning processing is smaller than the contribution of the divided good-article image to the learning processing. Therefore, the good-article surrounding image included in the good-article surrounding-containing image is preferably reduced. More specifically, the good-article surrounding image is preferably reduced such that the size (that is, the number of pixels) of the reduced good-article surrounding image is smaller than the size of the divided good-article image. The reduction of the good-article surrounding-containing image may be performed by the learning data generation part 110, for example. At this time, the learning data generation part 110 may reduce only the good-article surrounding image, or reduce the remaining images (for example, divided good-article images) included in the good-article surrounding-containing image together with the good-article surrounding image.

The learning data generation part 110 stores the generated learning data set in the learning data DB 104. In this embodiment, the learning data generation part 110 stores learning data sets generated for multiple good-article images in the learning data DB 104.

The model generation part 120 performs learning processing using multiple learning data sets, and generates a prelearned model which receives the divided good-article image and the good-article surrounding-containing image as inputs and which outputs the restored divided image. Here, the restored divided image is an image to restore the divided good-article image.

Figure 4:
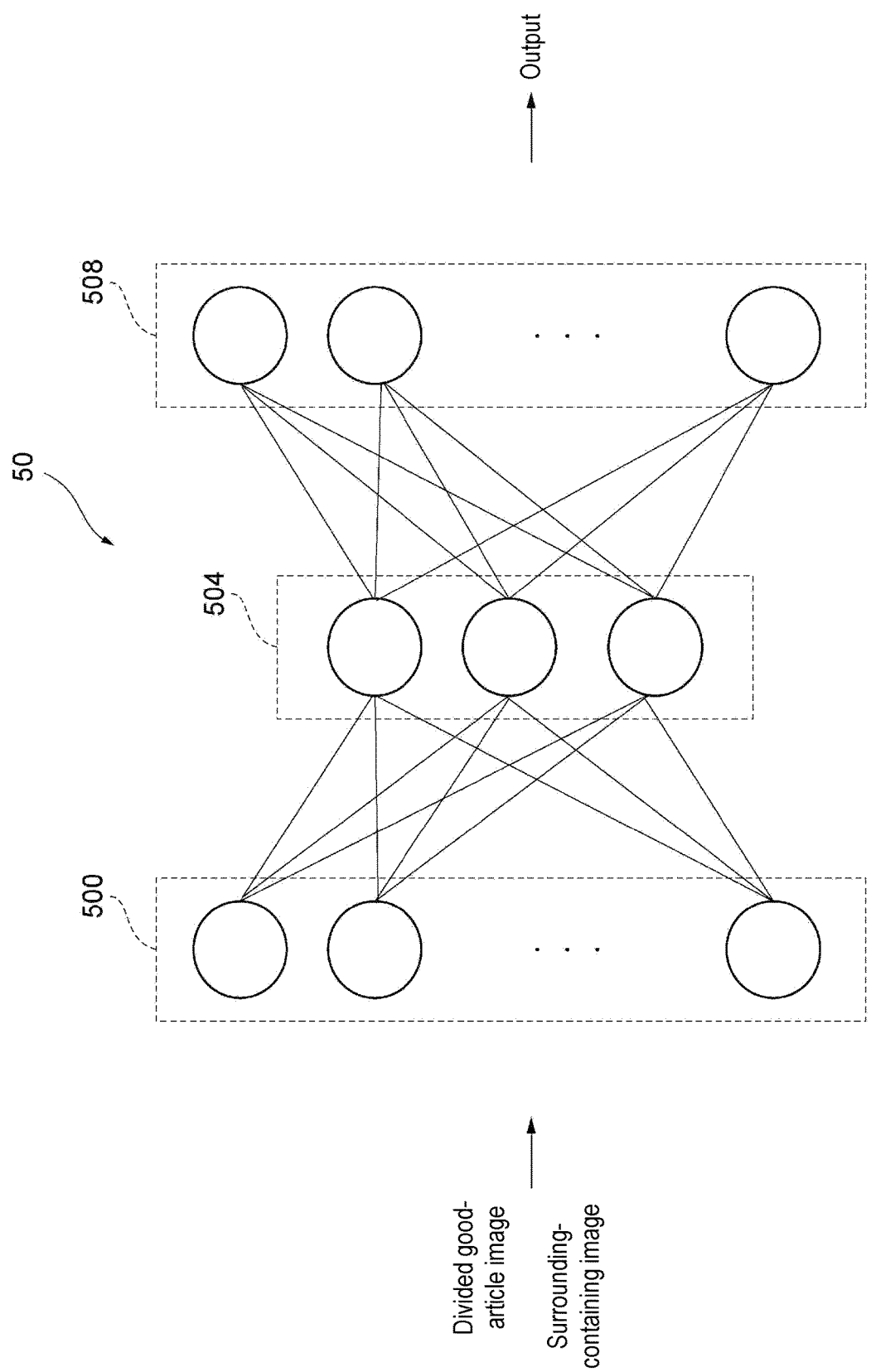
FIG. 4 is a diagram for illustrating a model learned by the model generation part according to an embodiment of the disclosure.

FIG. 4 is a diagram for illustrating a model learned by the model generation part 120 according to this embodiment. FIG. 4 shows a model 50 to be subjected to learning processing by the model generation part 120. In this embodiment, the model 50 includes a neural network with multiple layers, including an input layer. More specifically, the model 50 is an autoencoder and is configured by an input layer 500, an output layer 508, and multiple layers interposed between the input layer 500 and the output layer 508. When input data is input to the input layer 500, the input data is compressed into feature vectors in an intermediate layer 504, and output data is output from the output layer 508. Further, the model used to construct the prelearned model is not limited to the autoencoder. In addition, the number of layers configuring the neural network is not limited to three layers.

The model generation part 120 inputs the divided good-article image and the good-article surrounding-containing image to the input layer 500 of the model 50. Specifically, the model generation part 120 inputs each of multiple pixel values included in the divided good-article image and the good-article surrounding-containing image to the input layer 500. In this way, the image is output from the output layer 508 of the model 50 as output data. At this time, the model generation part 120 may compress the dimension of the good-article surrounding-containing image to the dimension of the divided good-article image and input it to the input layer 500.

The model generation part 120 makes the model 50 learn by updating the weighting parameter between the layers included in the model 50 so that the output data is data for restoring divided good-article images. In summary, the model generation part 120 inputs multiple learning data sets to the input layer 500 of the model 50 and updates the weighting parameter to generate a prelearned model. The model generation part 120 stores the generated prelearned model in the prelearned model DB 106.

Figure 5:
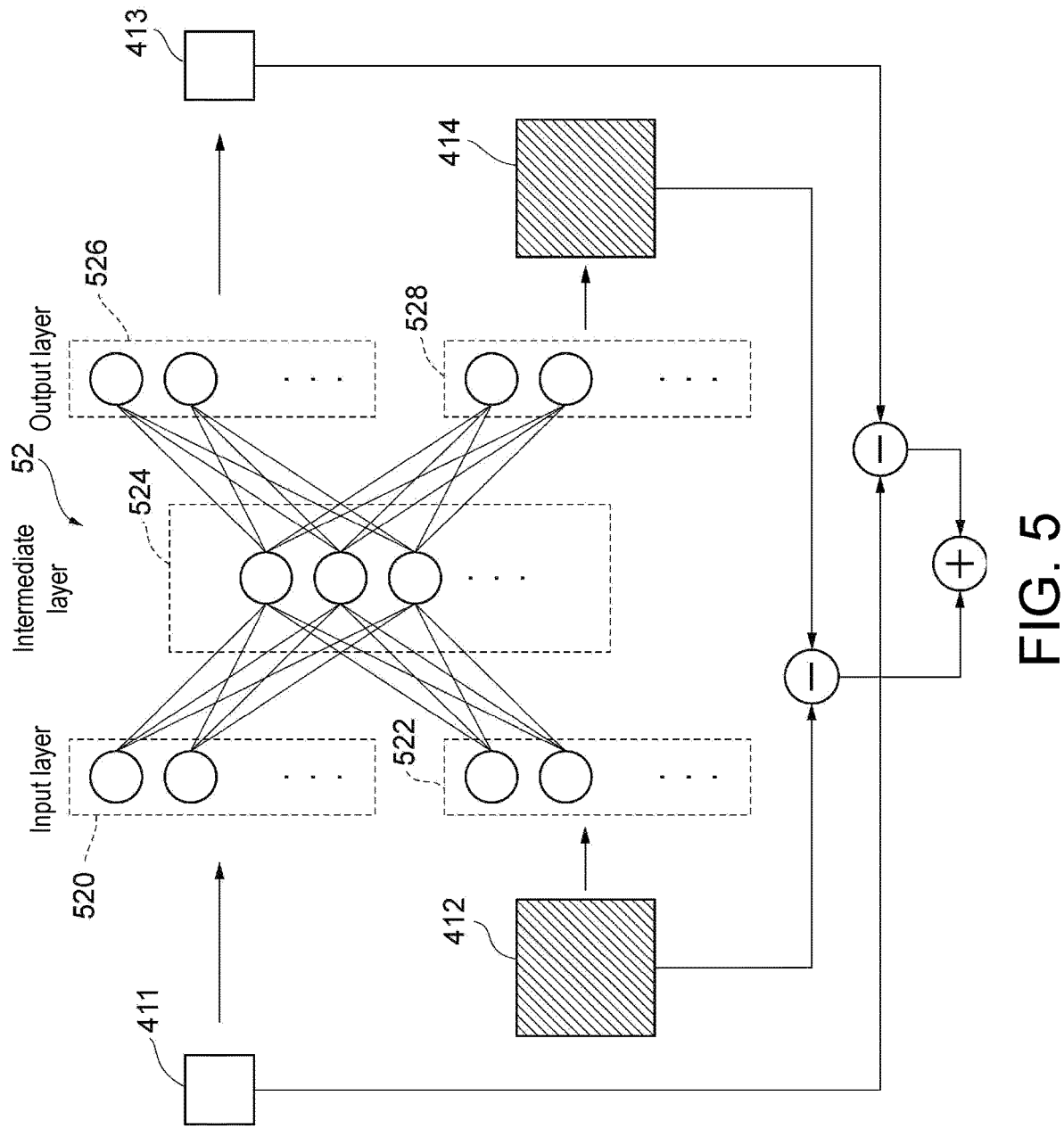
FIG. 5 is a diagram for illustrating an example of how the model generation part generates a prelearned model.
Figure 6:
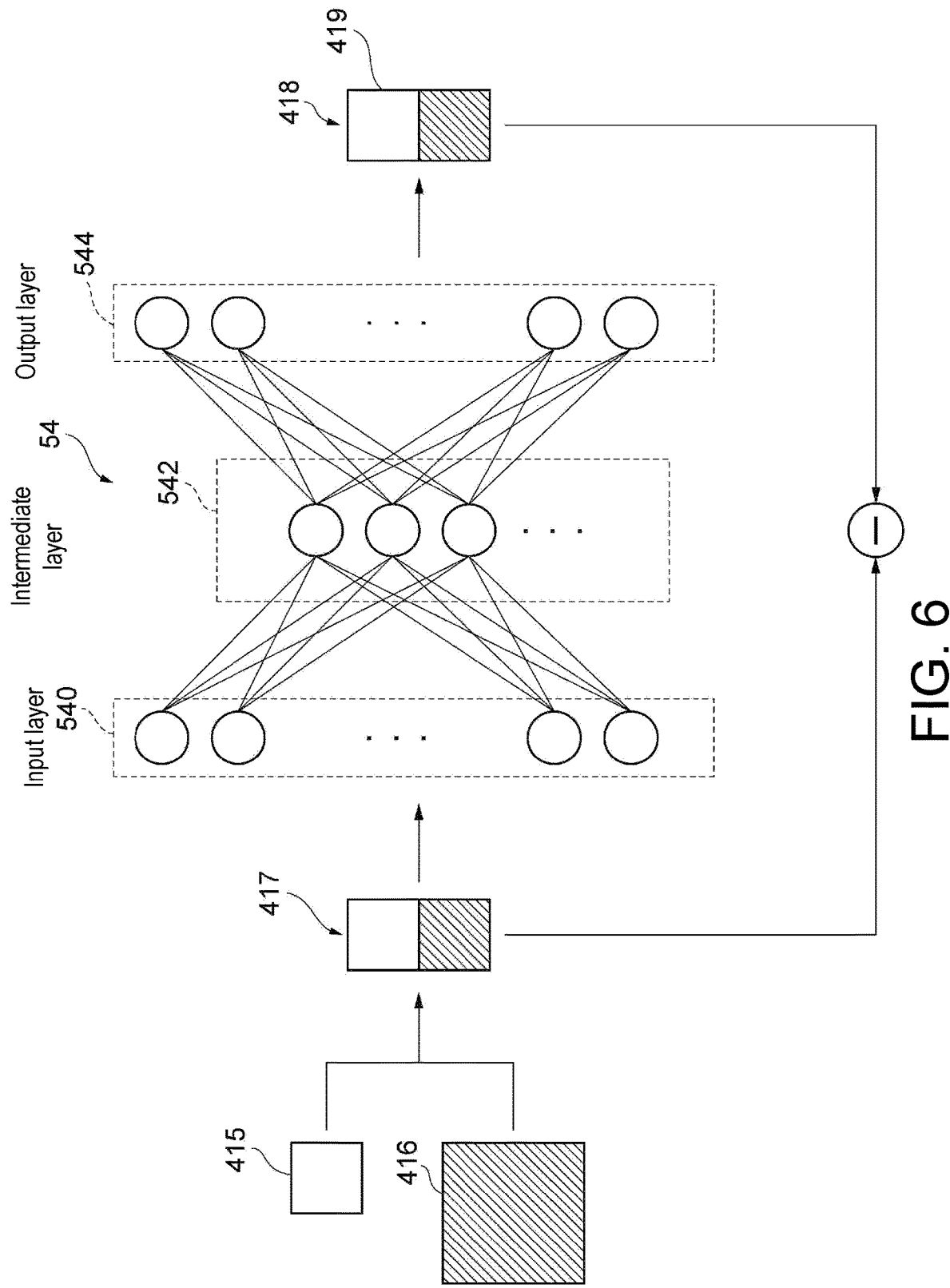
FIG. 6 is a diagram for illustrating an example of how the model generation part generates a prelearned model.

Here, two specific examples of how the model generation part 120 according to this embodiment generates a prelearned model will be described with reference to FIGS. 5 and 6. FIG. 5 and FIG. 6 are each a diagram for illustrating an example of how the model generation part 120 generates a prelearned model.

First, with reference to FIG. 5, a first specific example in which the model generation part 120 generates a prelearned model will be described. A model 52 shown in FIG. 5 has two channels in each of the input and output layers. Specifically, the model 52 has a first input channel 520 and a second input channel 522 in the input layer and a first output channel 526 and a second output channel 528 in the output layer. The first input channel 520 and the second input channel 522 are connected to the first output channel 526 and the second output channel 528 via an intermediate layer 524.

The model generation part 120 inputs each of the divided good-article image 411 and the corresponding good-article surrounding-containing image 412 to the corresponding input channel. Specifically, the model generation part 120 inputs the divided good-article image 411 into the first input channel 520 and inputs the corresponding good-article surrounding-containing image 412 into the second input channel 522. When the model generation part 120 inputs the divided good-article image 411 and the corresponding good-article surrounding-containing image 412 to the input layer, a first output image 413 is output from the first output channel 526, and a second output image 414 is output from the second output channel 528.

The model generation part 120 uses a difference between the divided good-article image 411 and the first output image 413 (hereinafter also referred to as a "first difference") and the difference between the good-article surrounding-containing image 412 and the second output image 414 (hereinafter also referred to as a "second difference") as an evaluation value, and determines the weighting parameter between the layers in the model 52 so that the evaluation value is minimized. At this time, the model generation part 120 may weight the first difference and the second difference, and use the sum of the weighted first difference and second difference as an evaluation value to determine the weighting parameter in the model 52. The weighting of the second difference is preferably smaller than the weighting of the first difference. By determining the weighting parameter in the model 52, a prelearned model is generated which, when the divided good-article image 411 and the first output image 413 are input to the input layer, outputs the restored divided image as the first output image 413 from the first output channel 526, and outputs an image that restores the good-article surrounding-containing image 412 as the second output image 414 from the second output channel 528.

Next, with reference to FIG. 6, a second specific example in which the model generation part 120 generates a prelearned model will be described. In a model 54 shown in FIG. 6, unlike the model 52 shown in FIG. 5, an input layer 540 and an output layer 544 each have one channel.

In the second example, the model generation part 120 generates a combined image 417 by combining a divided good-article image 415 and a good-article surrounding-containing image 416. Here, the good-article surrounding-containing image 416 is reduced so that the size of the good-article surrounding-containing image 416 becomes the same as the size of the divided good-article image 415. In addition, the good-article surrounding-containing image 416 may not be reduced, or may be reduced in a way in which the size of the good-article surrounding-containing image 416 is different from that of the divided good-article image 415.

When the model generation part 120 inputs the combined image 417 to the input layer 540, an output image 418 is output from the output layer 544 connected to the input layer 540 via an intermediate layer 542. The model generation part 120 uses a difference between the output image 418 and the combined image 417 as an evaluation value, and determines the weighting parameter between the layers in the model 54 so that the evaluation value is minimized. In this way, a prelearned model is generated which, when the combined image 417 is input to the input layer 540, outputs the restored combined image that restores the combined image 417 as the output image 418 from the output layer 544. Here, the restored combined image includes an image 419 corresponding to the restored divided image. When the prelearned model is used for inspection of the inspection target, the image 419 included in the restored combined image is cut out, and a restored image for restoring the good-article image is generated based on the cut-out image 419.

With reference back to FIG. 2, the communication part 130 included in the prelearned model generation device 10 will be described. The communication part 130 may transmit and receive various types of information. For example, the communication part 130 may transmit the prelearned model to the image inspection device 20 via the communication network 15.

Figure 7:
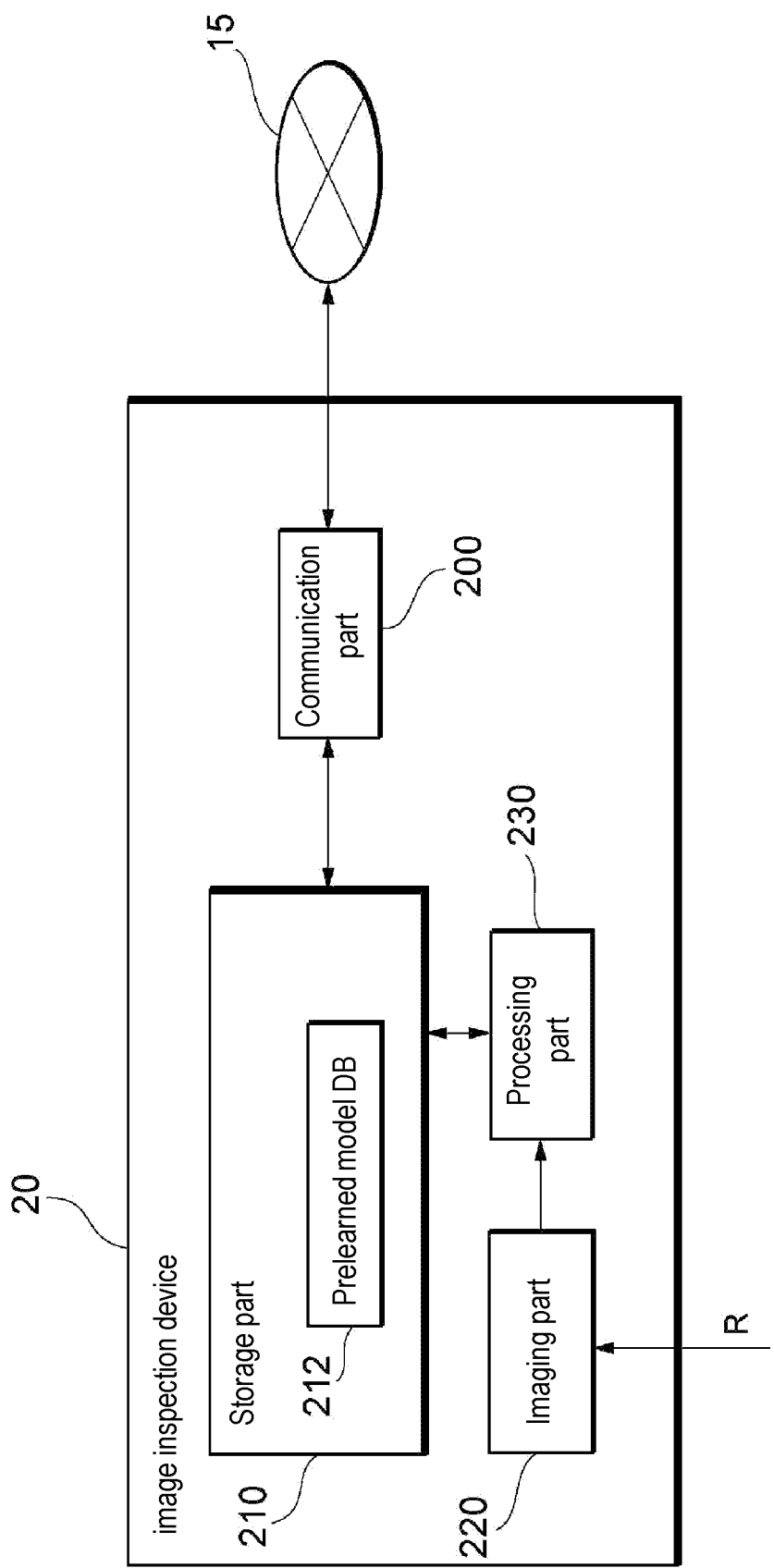
FIG. 7 is a functional block diagram showing the configuration of the image inspection device according to the same embodiment.

FIG. 7 is a functional block diagram showing the configuration of the image inspection device 20 according to this embodiment. The image inspection device 20 includes a communication part 200, a storage part 210, an imaging part 220 and a processing part 230.

The communication part 200 may transmit and receive various types of information. For example, the communication part 200 may receive a prelearned model from the prelearned model generation device 10 via the communication network 15. Further, the communication part 200 may store a prelearned model and the like in the storage part 210.

The storage part 210 stores various information. In this embodiment, the storage part 210 includes a prelearned model DB 212. The prelearned model DB 212 stores prelearned models. Various information stored in the storage part 210 is referred to by the processing part 230 as necessary.

The imaging part 220 includes various known imaging devices and captures an image of the inspection target 30. In this embodiment, the imaging part 220 receives the reflected light R from the inspection target 30 and captures an image of the inspection target 30. The imaging part 220 transmits the captured image to the processing part 230.

Figure 8:
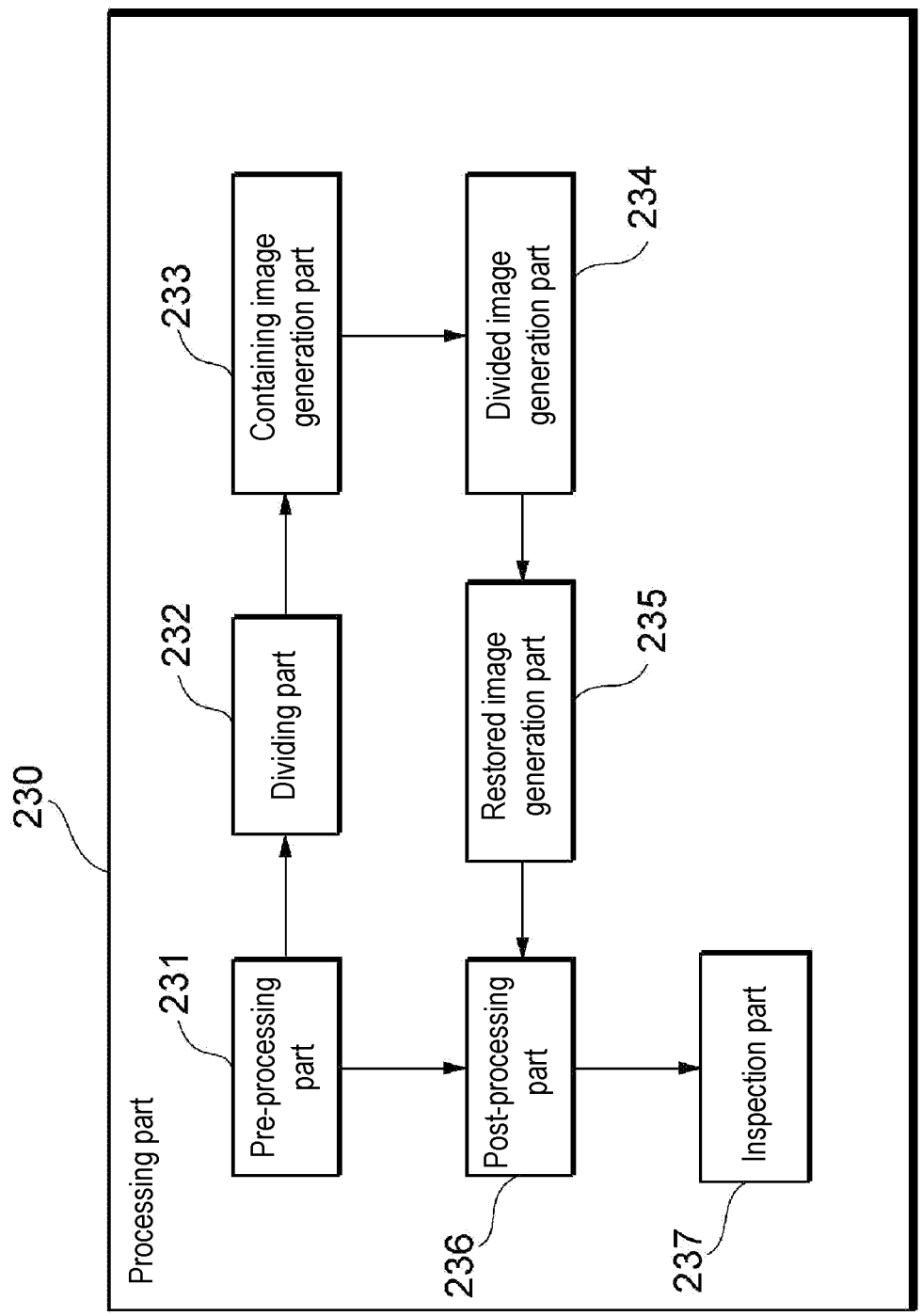
FIG. 8 is a functional block diagram showing the configuration of the processing part according to the same embodiment.

The processing part 230 may perform various types of processing on the image of the inspection target to inspect the inspection target. FIG. 8 is a functional block diagram showing the configuration of the processing part 230 according to this embodiment. The processing part 230 includes a pre-processing part 231, a dividing part 232, a containing image generation part 233, a divided image generation part 234, a restored image generation part 235, a post-processing part 236 and an inspection part 237.

The pre-processing part 231 performs various types of pre-processing on the image of the inspection target. The pre-processing part 231 may, for example, perform processing of correcting positional deviation on the image of the inspection target. The pre-processing part 231 transmits the pre-processed image to the dividing part 232.

The dividing part 232 may divide the image of the inspection target to generate multiple divided inspection images. In this embodiment, the dividing part 232 divides the image of the inspection target by a method similar to the division of the good-article image in the prelearned model generation device 10. Specifically, the dividing part 232 divides the image of the inspection target into five parts both vertically and horizontally to generate twenty-five divided inspection images. The dividing part 232 transmits the generated divided inspection images to the containing image generation part 233.

The containing image generation part 233 generates an inspection surrounding-containing image. The inspection surrounding-containing image is an image including an image based on an inspection surrounding image. In this embodiment, the inspection surrounding-containing image includes the surrounding-containing image and the divided inspection image. Here, the inspection surrounding image is at least a part of the image of the surrounding of the divided inspection image. The containing image generation part 233 may generate an inspection surrounding-containing image based on a predetermined algorithm, or may generate an inspection surrounding-containing image based on an operation of a user. The set of divided inspection images and the generated inspection surrounding-containing images becomes the input data set.

The containing image generation part 233 generates inspection surrounding-containing images for each of the multiple divided inspection images to generate multiple input data sets. In this embodiment, the containing image generation part 233 generates inspection surrounding-containing images for nine divided inspection images excluding the divided inspection images at the edges among the twenty-five divided inspection images generated by the dividing part 232. At this time, if the good-article surrounding image has been reduced during the learning processing, the containing image generation part 233 may reduce the inspection surrounding image included in the inspection surrounding-containing image in accordance with the reduction of the good-article surrounding image. The containing image generation part 233 transmits the generated input data set to the divided image generation part 234.

The divided image generation part 234 may generate a restored divided image by inputting an input data set (set of the divided inspection image and the inspection surrounding-containing image) to a prelearned model. The prelearned model is a prelearned model generated by the prelearned model generation device 10, which is made to learn to output a restored divided image by inputting a divided good-article image and a good-article surrounding-containing image.

In this embodiment, the divided image generation part 234 inputs multiple input data sets each configured by the divided inspection image and the inspection surrounding-containing image to the prelearned model, and generates multiple restored divided images. Here, if the prelearned model has two channels in the input layer as described with reference to FIG. 5, the divided image generation part 234 inputs the divided inspection image and the inspection surrounding-containing image to corresponding channels. Further, when the prelearned model outputs the restored combined image described with reference to FIG. 6, the restored image generation part 235 cuts out the divided restored images from the restored combined image. Each of the multiple restored divided images generated corresponds to each of the multiple input data sets. The restored divided image is an image obtained by restoring the divided good-article image. Therefore, when a defect or the like is included in the divided inspection image, an image from which the defect is removed is output from the prelearned model as the restored divided image. In this embodiment, the divided image generation part 234 generates restored divided images based on each of the nine input data sets generated based on the inspection image, and transmits the generated nine restored divided images to the restored image generation part 235.

The restored image generation part 235 generates a restored image by synthesizing multiple restored divided images. In this embodiment, the restored image generation part 235 generates a restored image by synthesizing the nine restored divided images generated by the divided image generation part 234. Specifically, the restored image generation part 235 generates the restored image by arranging and synthesizing the generated nine restored divided images at the positions of the corresponding divided inspection images. The restored image is an image obtained by restoring the good-article image. Therefore, when a defect or the like is included in the inspection image, an image from which the defect is removed is output as the restored image.

Figure 9:
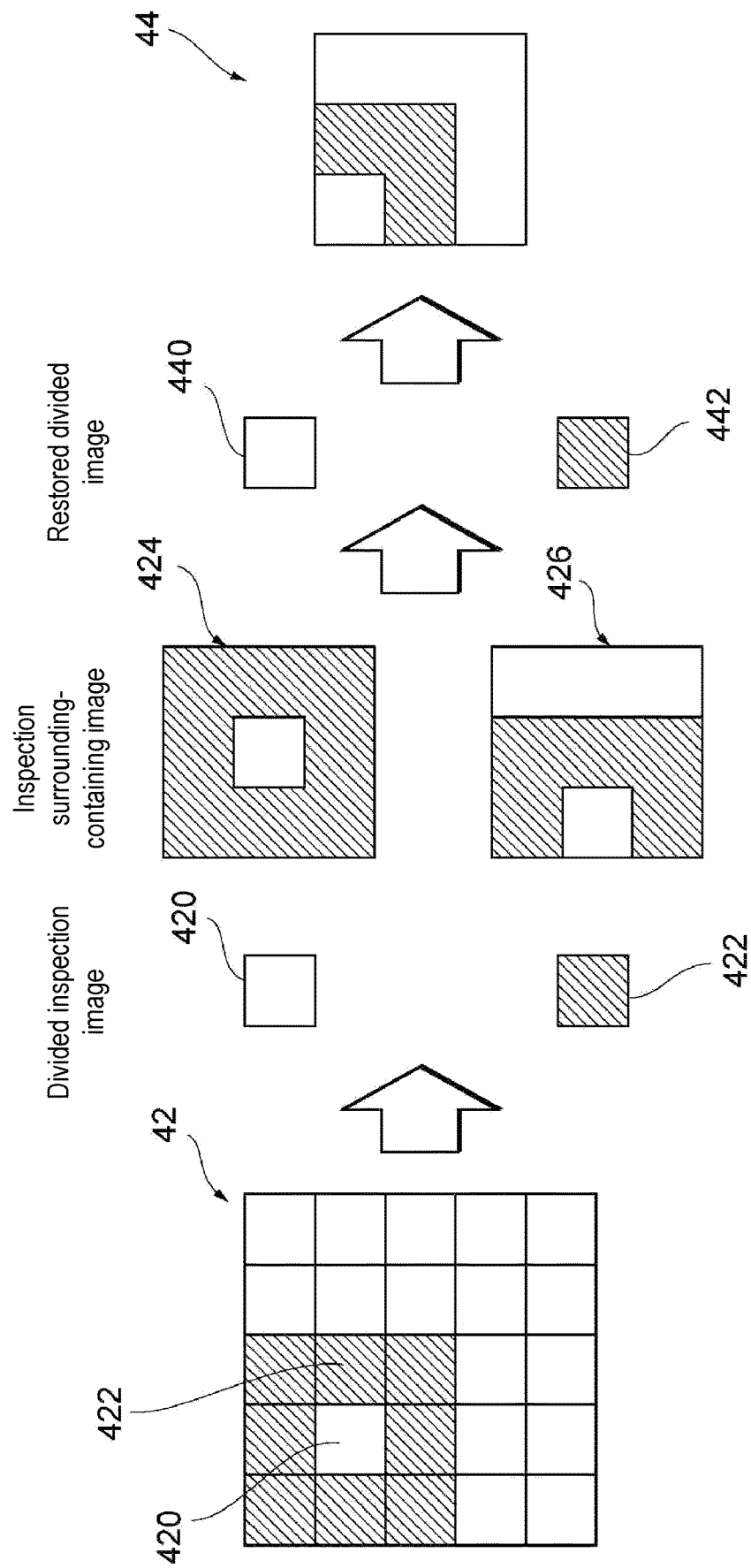
FIG. 9 is a diagram for illustrating the processing until the processing part generates a restored image based on an inspection image.

An example of processing until the processing part 230 generates a restored image 44 based on an inspection image 42 will be described with reference to FIG. 9.

The dividing part 232 divides the inspection image 42 into five parts both vertically and horizontally to generate twenty-five divided inspection images. The containing image generation part 233 generates an inspection surrounding-containing image for each of the nine divided inspection images on the inner side among the generated twenty-five divided inspection images. For example, a first inspection surrounding-containing image 424 is generated for a first divided inspection image 420 and a second inspection surrounding-containing image 426 is generated for a second divided inspection image 422. A set of the divided inspection image and the inspection surrounding-containing image serves as an input data set.

The divided image generation part 234 inputs each of the generated nine input data sets to the prelearned model, and generates nine restored divided images. For example, the first restored divided image 440 is generated based on the first divided inspection image 420, and the second restored divided image 442 is generated based on the second divided inspection image 422. The restored image generation part 235 generates the restored image 44 by synthesizing the generated nine restored divided images.

With reference back to FIG. 8, the post-processing part 236 will be described. The post-processing part 236 may perform post-processing on the restored image. For example, the post-processing part 236 may calculate the difference between the restored image and the inspection image to generate a difference image. Specifically, the post-processing part 236 may generate a difference image by calculating the difference between the corresponding pixel values of the inspection image from each of the multiple pixel values forming the restored image.

Figure 10:
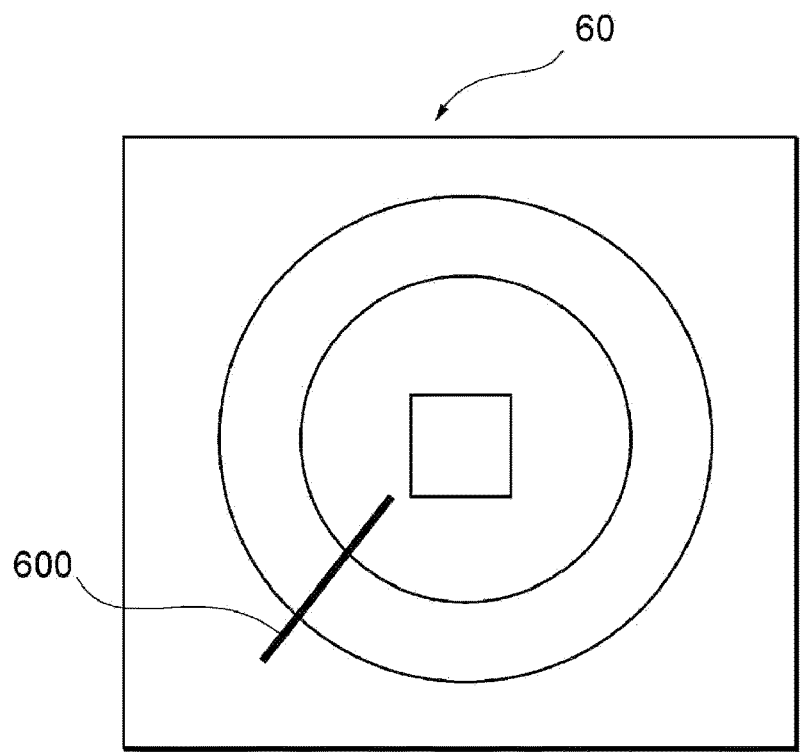
FIG. 10 is a diagram showing an example of an inspection image.
Figure 11:
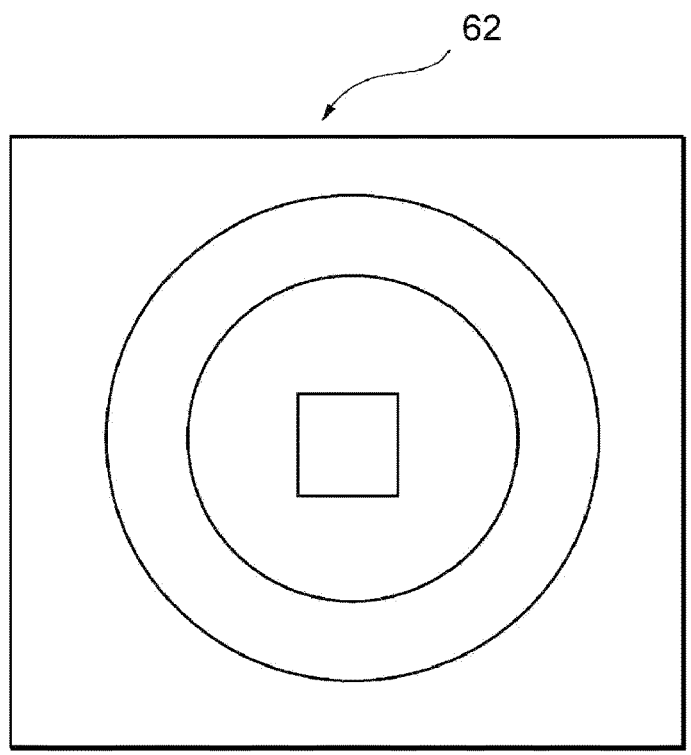
FIG. 11 is a diagram showing an example of a restored image generated based on an inspection image.
Figure 12:
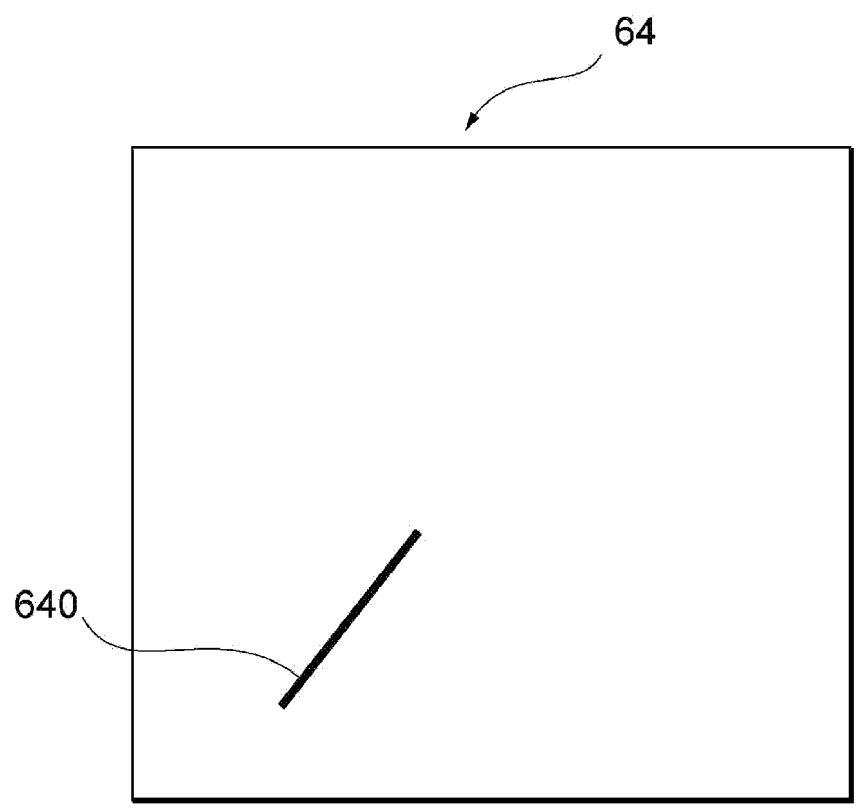
FIG. 12 is a diagram showing a difference image, which is the difference between the inspection image and the restored image.

The difference image generated by the post-processing part 236 will be described with reference to FIGS. 10 to 12. FIG. 10 is a diagram showing an example of an image 60 of the inspection target 30 according to this embodiment. FIG. 11 is a diagram showing an example of a restored image 62 generated based on the image 60. Further, FIG. 12 is a diagram showing a difference image 64 that is the difference between the image 60 and the restored image 62 of the inspection target. As shown in FIG. 10, the image 60 includes a linear defect image 600. A defect image is an image of a defect in an inspection target. In addition, as shown in FIG. 11, the defect image is removed from the restored image 62. Therefore, the difference image 64 indicating the difference between the image 60 and the restored image 62 of the inspection target mainly includes a defect image 640. In this embodiment, inspection of the inspection target is performed based on the difference image 64 including the defect image 640.

With reference back to FIG. 8, the inspection part 237 will be described. The inspection part 237 may inspect the inspection target 30 based on the restored divided images generated by the divided image generation part 234. In this embodiment, the inspection part 237 inspects the inspection target 30 based on multiple restored divided images.

In this embodiment, the inspection part 237 inspects the inspection target based on the difference between the inspection image and the restored image. Specifically, the inspection part 237 inspects the inspection target based on the difference image generated by the post-processing part 236.

Further, the inspection part 237 may detect defects in the inspection target 30. For example, the inspection part 237 may detect defects in the inspection target 30 by detecting the defect image 640 included in the difference image 64 shown in FIG. 12. Alternatively, the inspection part 237 may determine whether the inspection target 30 is good or defective. Specifically, the inspection part 237 may determine whether the inspection target 30 is good or defective based on the size of the defect image included in the difference image 64. More specifically, the inspection part 237 may determine that the inspection target is defective when the size of the defect image included in the difference image 64 exceeds a predetermined threshold.

Figure 13:
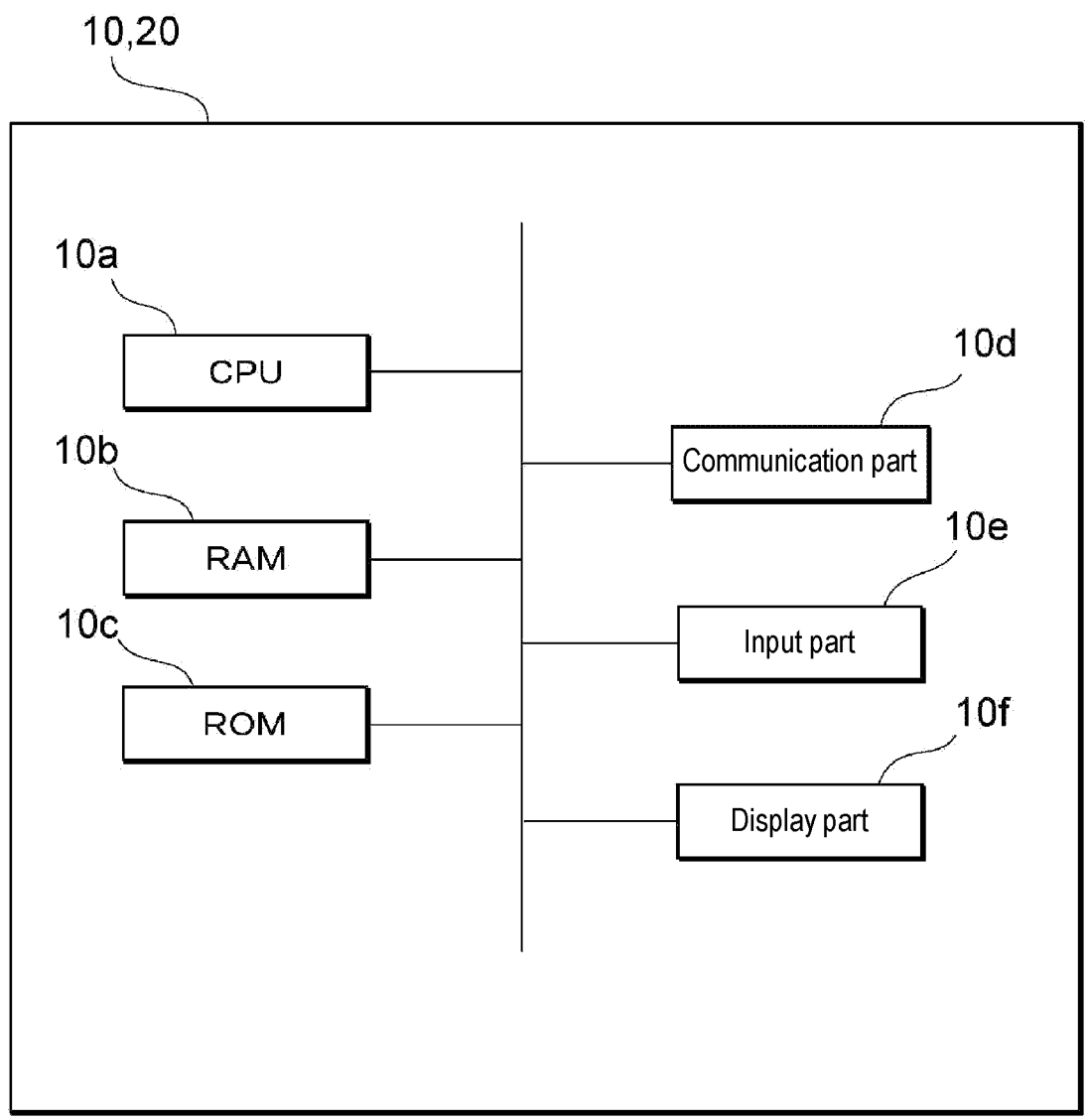
FIG. 13 is a diagram showing the physical configuration of the image inspection device and the prelearned model generation device according to this embodiment.

FIG. 13 is a diagram showing the physical configuration of the prelearned model generation device 10 and the image inspection device 20 according to this embodiment. The prelearned model generation device 10 and the image inspection device 20 include a central processing unit (CPU) 10*a* equivalent to a calculation part, a random access memory (RAM) 10*b* equivalent to a storage part, a read only memory (ROM) 10*c* equivalent to a storage part, a communication part 10*d*, an input part 10*e*, and a display part 10*f*. These components are connected to each other via a bus so that data may be sent and received.

In this example, the prelearned model generation device 10 and the image inspection device 20 are each configured by a computer, but the prelearned model generation device 10 and the image inspection device 20 may each be realized by combining multiple computers. Further, the image inspection device 20 and the prelearned model generation device 10 may be configured by one computer. Further, the configuration shown in FIG. 13 is an example, and the prelearned model generation device 10 and the image inspection device 20 may have configurations other than these, or may not have some of these configurations.

The CPU 10*a* is a computing part that performs control related to execution of programs stored in the RAM 10*b* or ROM 10*c* and computes and processes data. The CPU 10*a* included in the prelearned model generation device 10 is a computing part that executes a program (learning program) that performs learning processing using learning data and generates a prelearned model. Further, the CPU 10*a* included in the image inspection device 20 is a computing part that executes a program (image inspection program) for inspecting an inspection target using an image of the inspection target. The CPU 10*a* receives various data from the input part 10*e* and the communication part 10*d*, and displays the calculation results of the data on the display part 10*f* and stores them in the RAM 10*b*.

The RAM 10*b* is a rewritable part of the storage part, and may be configured by, for example, a semiconductor memory element. The RAM 10*b* may store data such as programs executed by the CPU 10*a*, learning data, and prelearned models. In addition, these are examples, and the RAM 10*b* may store data other than these, or may not store some of them.

The ROM 10*c* is a part of the storage part from which data may be read, and may be configured by, for example, a semiconductor memory element. The ROM 10*c* may store, for example, an image inspection program, a learning program, and data that is not rewritten.

The communication part 10*d* is an interface that connects the image inspection device 20 to other equipment. The communication part 10*d* may be connected to a communication network such as the Internet.

The input part 10*e* receives data input from the user, and may include, for example, a keyboard and a touch panel.

The display part 10*f* visually displays the calculation results by the CPU 10*a*, and may be configured by, for example, a liquid crystal display (LCD). The display part 10*f* may display, for example, the inspection result of the inspection target.

The image inspection program may be provided by being stored in a computer-readable storage medium such as the RAM 10*b* and the ROM 10*c*, or may be provided via a communication network connected by the communication part 10d. In the prelearned model generation device 10, the CPU 10a executes the learning program to realize various operations described with reference to FIG. 2 and the like. Further, in the image inspection device 20, the CPU 10a executes the image inspection program to realize various operations described with reference to FIGS. 7 and 8 and the like. In addition, these physical configurations are examples, and they do not necessarily have to be independent configurations. For example, each of the prelearned model generation device 10 and the image inspection device 20 may include a large-scale integration (LSI) in which the CPU 10a, the RAM 10b, and the ROM 10c are integrated.

Figure 14:
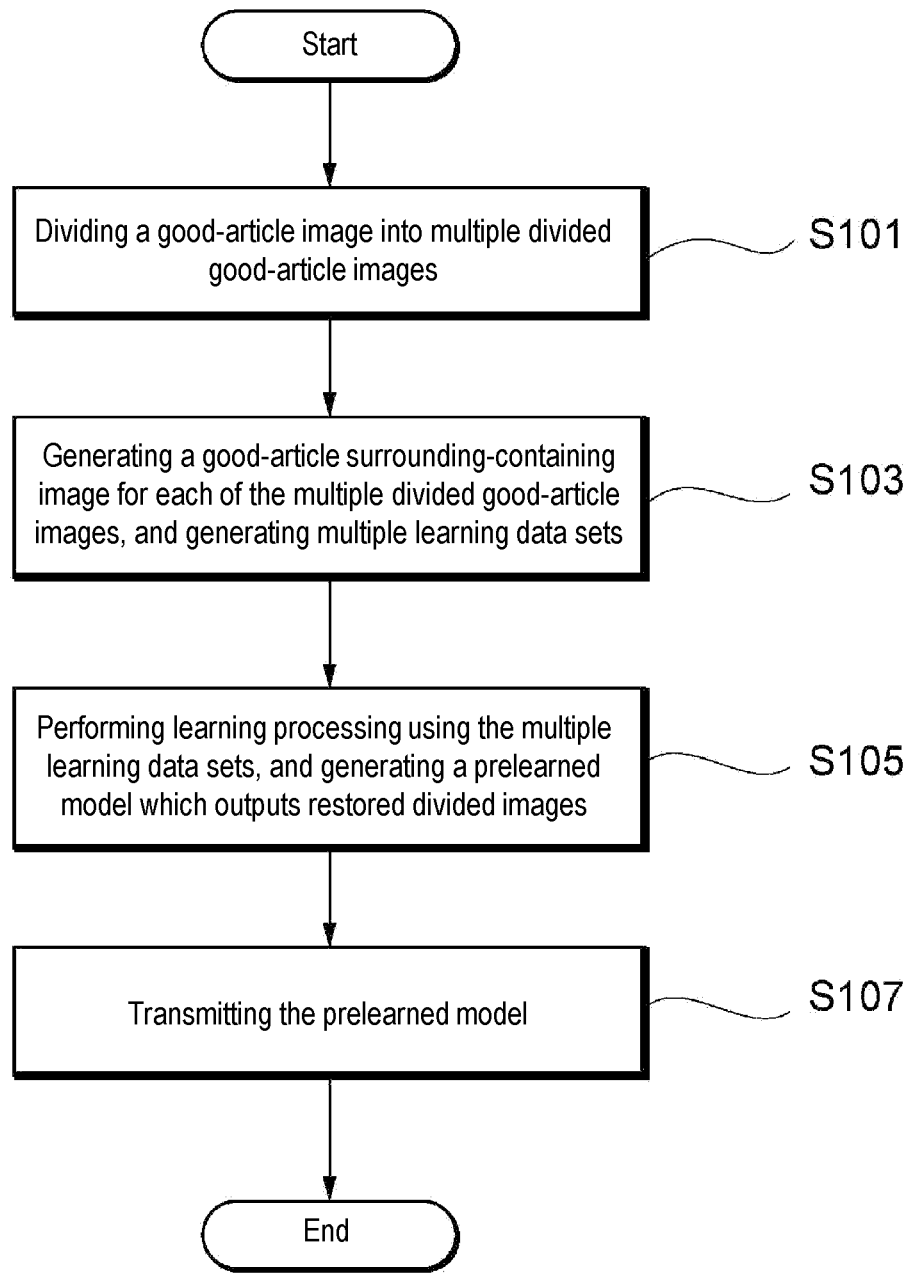
FIG. 14 is a flow chart showing an example of a flow in which the prelearned model generation device 10 generates a prelearned model.

FIG. 14 is a flow chart showing an example of a flow in which the prelearned model generation device 10 generates a prelearned model.

First, the learning data generation part 110 divides a good-article image stored in the good-article image DB 102 into multiple divided good-article images (step S101). At this time, if multiple good-article images are stored in the good-article image DB 102, the learning data generation part 110 may divide each of the multiple good-article images to generate divided good-article images corresponding to each of the good-article images.

Next, the learning data generation part 110 generates a good-article surrounding-containing image for each of the divided good-article images generated in step S101, and generates multiple learning data sets (step S103). The learning data generation part 110 stores the generated learning data sets in the learning data DB 104.

Next, the model generation part 120 performs learning processing using the multiple learning data sets stored in the learning data DB 104, and generates a prelearned model which receives the divided good-article images and the good-article surrounding-containing images as inputs and which outputs restored divided images (step S105). The model generation part 120 stores the generated prelearned model in the prelearned model DB 106.

Next, the communication part 130 transmits the prelearned model generated in step S105 to the image inspection device 20 (step S107). As a result, the image inspection device 20 may use the prelearned model generated by the prelearned model generation device 10.

Figure 15:
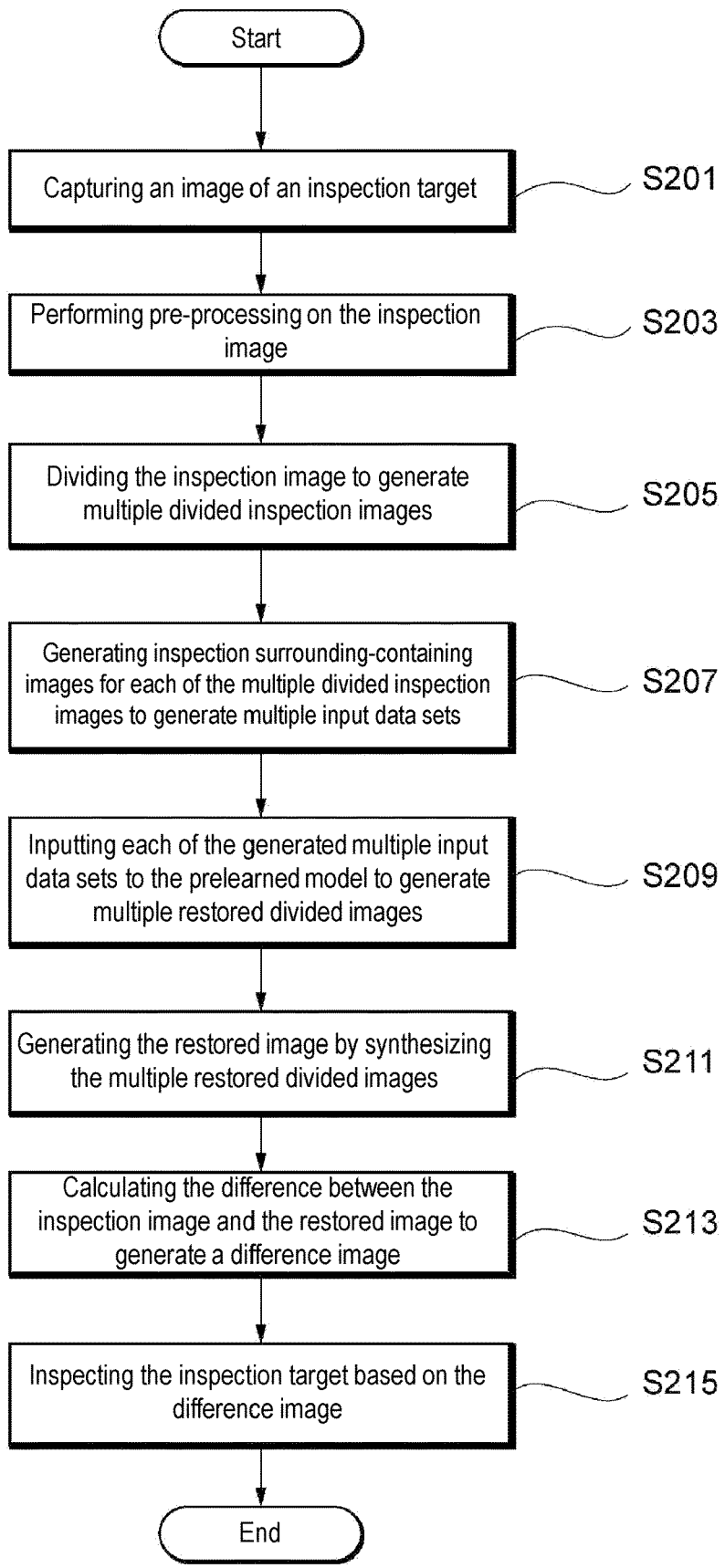
FIG. 15 is a flow chart showing an example of a flow in which the image inspection device inspects an inspection target using a prelearned model based on an image of the inspection target.

FIG. 15 is a flow chart showing an example of a flow in which the image inspection device 20 inspects an inspection target using a prelearned model based on an image of the inspection target.

First, the imaging part 220 included in the image inspection device 20 captures an image of an inspection target (step S201). The imaging part 220 transmits the captured image to the processing part 230.

Next, the pre-processing part 231 included in the processing part 230 performs pre-processing on the image captured in step S201 (step S203). Next, the dividing part 232 divides the inspection image pre-processed in step S203 to generate multiple divided inspection images (step S205). Next, the containing image generation part 233 generates inspection surrounding-containing images for each of the multiple divided inspection images generated in step S205 to generate multiple input data sets (step S207).

Next, the divided image generation part 234 inputs each of the generated multiple input data sets generated in step S207 to the prelearned model to generate multiple restored divided images (step S209). Next, the restored image generation part 235 generates the restored image by synthesizing the generated multiple restored divided images generated in step S209 (step S211). Next, the post-processing part 236 calculates the difference between the inspection image captured in step S201 and the restored image generated in step S211 to generate a difference image (step S213).

Next, the inspection part 237 inspects the inspection target based on the difference image generated in step 213 (S215).

According to this embodiment, in addition to the divided inspection image, the restored divided image is generated using a surrounding-containing image that includes at least a part of the surrounding image. Therefore, it becomes possible to generate the restored divided image more accurately. As a result, the special pattern may be restored, and the generation of defective patterns may be suppressed.

Figure 16:
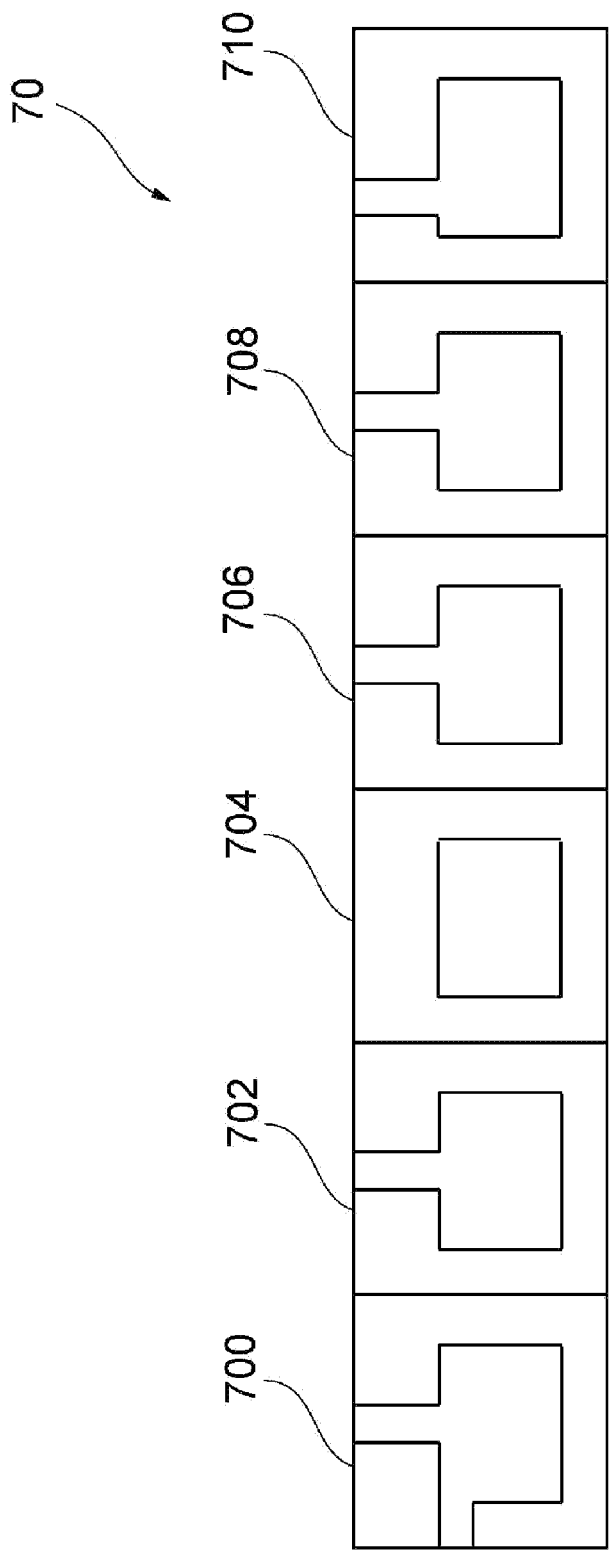
FIG. 16 is a diagram showing an example of an inspection image.

The effect of this embodiment will be described more specifically with reference to FIG. 16. FIG. 16 is a diagram showing an example of an inspection image 70. The inspection image 70 is divided into six divided inspection images 700, 702, 704, 706, 708 and 710. Among these six divided inspection images, the divided inspection images 702, 706 and 708 are set to be similar to each other. Further, the divided inspection image 704 includes a special pattern different from other divided inspection images.

It is supposed that a prelearned model is generated using these six divided inspection images as learning data without using the good-article surrounding-containing image. When the divided inspection image 704 is input to this prelearned model, if the prelearned model has low expressive ability, the divided inspection images 702, 704 or 708 may be output and the special pattern may not be restored.

On the other hand, the image inspection device 20 according to this embodiment uses inspection surrounding-containing images in addition to divided inspection images. Therefore, it is possible to generate a restored divided image corresponding to at least a part of the divided inspection image and its surrounding images. Therefore, it is possible to restore the divided inspection image more accurately than when only the divided inspection image is used. As a result, even if the divided inspection image includes a special pattern at a specific position, the special pattern may be restored. For example, even a divided inspection image showing a special pattern like the divided inspection image 704 may be appropriately restored.

In addition, in an image of a good-article inspection target, a pattern at one position or part that is good may be a defect at another position or part. Even in such a case, the image inspection device 20 according to this embodiment may generate a restored divided image of a good-article product from a divided inspection image including a pattern of a defective product; therefore, generation of a defective-article pattern is suppressed. As a result, overlooking of defective products may be suppressed.

The embodiments described above are for facilitating the understanding of the disclosure, and are not for limiting the interpretation of the disclosure. Each element included in the embodiments and its disposition, material, condition, shape, size, and the like are not limited to those exemplified, and may be changed as appropriate. Further, it is possible to replace or combine a part of the configurations shown in different embodiments.

In the above embodiments, the divided good-article images at the edges are not used for the learning data sets. The disclosure is not limited thereto, and the divided good-article images at the edges may be used for the learning data set. In this case, the learning data generation part 110 may generate good-article surrounding-containing images corresponding to the divided good-article images at the edges by generating pixel values in the area outside the good-article image. For example, the learning data generation part 110 may use a specific value determined by the user as the pixel value in the outside area. Alternatively, the learning data generation part 110 may copy the pixel value of the divided good-article image at the edge at the position closest to the target position, and use the copied pixel value as the pixel value at the target position.

Therefore, though in the above embodiments, the learning data generation part 110 generates the good-article surrounding-containing images for the nine divided good-article images in the middle of the twenty-five divided good-article images, the learning data generation part 110 may generate good-article surrounding-containing images for all the twenty-five divided good-article images.

Similarly, in the above embodiments, the divided inspection images at the edges are not used in the input data sets, but the divided inspection images at the edges may be used in the input data sets. In this case, for example, the pre-processing part 231 may generate inspection surrounding-containing images corresponding to the divided inspection images at the edges by generating pixel values in an area outside the inspection image. For example, the pre-processing part 231 may use a specific value determined by the user as the pixel value in the outside area. Alternatively, the pre-processing part 231 may copy the pixel value of the divided good-article image at the edge at the position closest to the target position, and use the copied pixel value as the pixel value at the target position.

Therefore, though in the above embodiments, the containing image generation part 233 generates the inspection surrounding-containing images for the nine divided inspection images in the middle of the twenty-five divided inspection images, the containing image generation part 233 may generate inspection surrounding-containing images for all the twenty-five divided inspection images.

In the above embodiments, the good-article surrounding-containing image includes the divided good-article images. However, the disclosure is not limited thereto, and the good-article surrounding-containing image may not include all or a part of the divided good-article images. That is, the good-article surrounding-containing image may be only the good-article surrounding image, or may be an image including the good-article surrounding image and a part of the divided good-article images. Further, the inspection surrounding-containing image may be only the inspection surrounding image, or may be an image including the inspection surrounding image and a part of the divided inspection images.

APPENDIX

An image inspection device (20) includes:
a divided image generation part (234) that inputs a divided inspection image, which is an image obtained by dividing an image of an inspection target (30), and a surrounding-containing image, which includes an image based on at least a part of a surrounding image of the divided inspection image, to a prelearned model, which has been trained to receive a divided good-article image, which is an image obtained by dividing an image of a good-article inspection target, and an image including an image based on at least a part of a surrounding image of the divided good-article image as an input to output a restored divided image, to generate the restored divided image; and
an inspection part (237) that inspects the inspection target based on the restored divided image generated by the divided image generation part (234).

What is claimed is:

1. An image inspection device comprising:
a first processor, configured to:
input a divided inspection image, which is an image obtained by dividing an image of an inspection target, and a surrounding-containing image, which comprises an image based on at least a part of a surrounding image of the divided inspection image, to a prelearned model, which has been trained to receive a divided good-article image, which is an image obtained by dividing an image of a good-article inspection target, and an image which comprises an image based on at least a part of a surrounding image of the divided good-article image as an input to output a restored divided good-article image, to generate a restored divided image; and
inspect the inspection target based on the restored divided image.

2. The image inspection device according to claim 1, wherein the first processor inputs each of a plurality of input data sets each configured by the divided inspection image and the surrounding-containing image to the prelearned model, and generates a plurality of the restored divided images, and
the first processor inspects the inspection target based on the plurality of restored divided images.

3. The image inspection device according to claim 2, wherein the first processor is further configured to generate a restored image by synthesizing the plurality of restored divided images,
wherein the first processor inspects the inspection target based on a difference between the image of the inspection target and the restored image.

4. The image inspection device according to claim 3, wherein the surrounding-containing image comprises an image obtained by reducing at least a part of the surrounding image of the divided inspection image.

5. The image inspection device according to claim 4, wherein the first processor determines whether the inspection target is good or defective.

6. The image inspection device according to claim 3, wherein the first processor determines whether the inspection target is good or defective.

7. The image inspection device according to claim 3, wherein the first processor detects defects in the inspection target.

8. The image inspection device according to claim 2, wherein the surrounding-containing image comprises an image obtained by reducing at least a part of the surrounding image of the divided inspection image.

9. The image inspection device according to claim 8, wherein the first processor determines whether the inspection target is good or defective.

10. The image inspection device according to claim 2, wherein the first processor determines whether the inspection target is good or defective.

11. The image inspection device according to claim 2, wherein the first processor detects defects in the inspection target.

12. The image inspection device according to claim 1, wherein the surrounding-containing image comprises an image obtained by reducing at least a part of the surrounding image of the divided inspection image.

13. The image inspection device according to claim 12, wherein the first processor determines whether the inspection target is good or defective.

14. The image inspection device according to claim 12, wherein the first processor detects defects in the inspection target.

15. The image inspection device according to claim 1, wherein the first processor determines whether the inspection target is good or defective.

16. The image inspection device according to claim 1, wherein the first processor detects defects in the inspection target.

17. The image inspection device according to claim 1, further comprising an image sensor that captures the image of the inspection target.

18. The image inspection device according to claim 1, wherein the first processor is further configured to divide the image of the inspection target into a plurality of the divided inspection images.

19. An image inspection method performed by a computer comprising a first processor, wherein the first processor performs:
    inputting a divided inspection image, which is an image obtained by dividing an image of an inspection target, and a surrounding-containing image, which comprises an image based on at least a part of a surrounding image of the divided inspection image, to a prelearned model, which has been trained to receive a divided good-article image, which is an image obtained by dividing an image of a good-article inspection target, and an image which comprises an image based on at least a part of a surrounding image of the divided good-article image as an input to output a restored divided good-article image, to generate a restored divided image; and
inspecting the inspection target based on the generated restored divided image.

20. A prelearned model generation device comprising:
a second processor, configured to:
    perform learning processing using a plurality of data sets each configured by a divided good-article image, which is an image obtained by dividing an image of a good-article inspection target, and a surrounding-containing image, which comprises an image based on at least a part of a surrounding image of the divided good-article image;
    generate a prelearned model which receives the divided good-article image and the surrounding-containing image as an input to output a restored divided image.

* * * * *